W. L. DIETZ.
Broom-Corn and Cotton-Scraper and Cultivator.
No. 224,402. Patented Feb. 10, 1880.
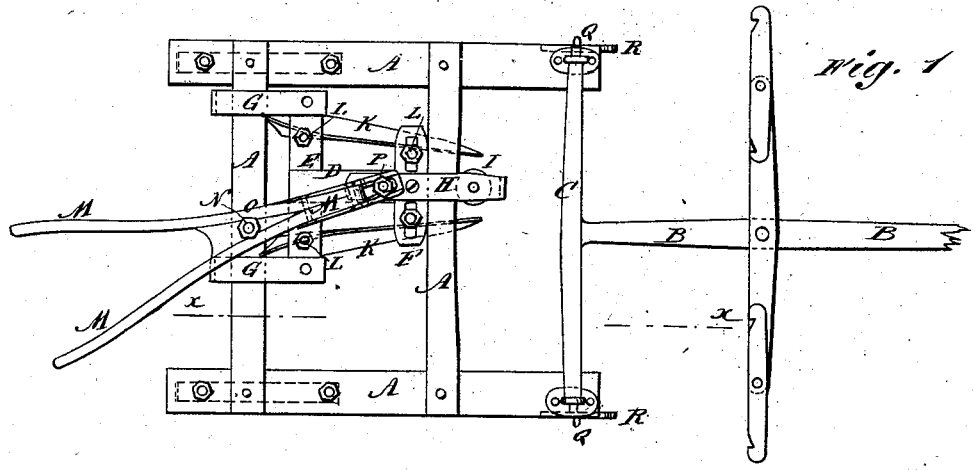
Fig. 1
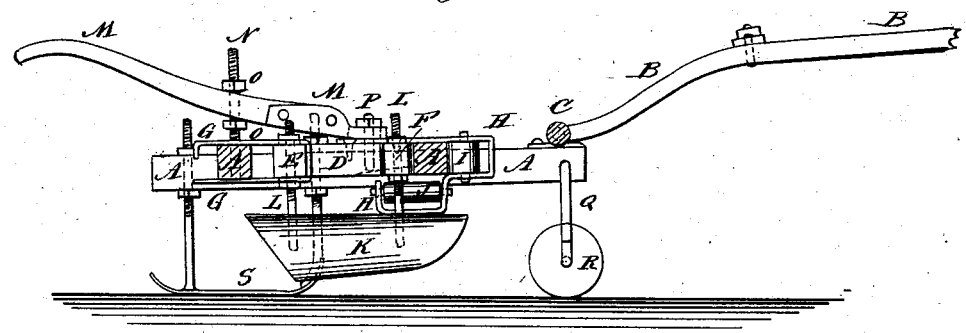
Fig. 2
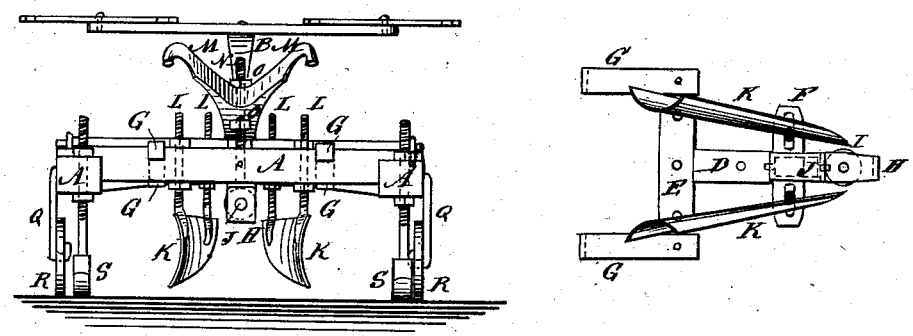
Fig. 3
Fig. 4
Fig. 5
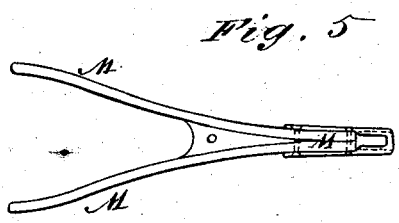
WITNESSES:
C. Neveux
C. Sedgwick
INVENTOR:
W. L. Dietz
BY Munn & Co
ATTORNEYS.

UNITED STATES PATENT OFFICE.

WILLIAM L. DIETZ, OF SCHOHARIE, NEW YORK.

BROOM-CORN AND COTTON SCRAPER AND CULTIVATOR.

SPECIFICATION forming part of Letters Patent No. 224,402, dated February 10, 1880.

Application filed November 13, 1879.

*To all whom it may concern:*

Be it known that I, WILLIAM L. DIETZ, of Schoharie, in the county of Schoharie and State of New York, have invented a new and useful Improvement in Broom-Corn and Cotton Scrapers and Cultivators, of which the following is a specification.

Figure 1 is a plan view of my improvement. Fig. 2 is a sectional side elevation. Fig. 3 is a rear elevation. Fig. 4 is a bottom view of the sliding frame detached. Fig. 5 is a plan view of the handles.

Similar letters of reference indicate corresponding parts.

The object of this invention is to furnish scrapers and cultivators for broom-corn, cotton, and other plants planted in rows and drills, so constructed that they may be readily guided to operate upon crooked rows and may be conveniently turned at the ends of the rows.

The invention consists in combining with the main frame a sliding frame to carry the scraper-plates, pivoted handles to guide and control the sliding frame, and wheels and runners to carry the machine, as will be hereinafter fully described.

A represents the frame of the machine, which is formed of two side bars connected near their rear ends, and at a little distance from their forward ends, by two cross-bars. B is the tongue, the rear end of which is attached to the cross-bar C. The ends of the cross-bar C work in bearings attached to the forward ends of the side bars of the frame A. D is a short longitudinal bar, to the rear end of which is attached the center of a short cross-bar, E. To the forward part of the bar D is bolted or otherwise detachably secured a shorter cross-bar, F. To the upper and lower sides of the ends of the short cross-bar E are attached straps G, which pass back above and below the rear cross-bar of the frame A. The rear ends of the upper straps, G, may be bent downward to overlap the rear side of the cross-bar of the frame A, as shown in Fig. 2. The straps G are designed to keep the frame D E F in line with the frame A. To the forward end of the bar D is attached a strap, H, which passes around the forward cross-bar of the frame A. To the strap H is pivoted a roller, I, which rests against the forward side of the forward cross-bar of the frame A. Upon the lower arm of the strap H is formed an offset, within which is pivoted a roller, J, to rest against the lower side of the front cross-bar of the frame A. The roller I sustains the draft-strain, and the roller J sustains the upward pressure, and allows the frame D E F to be easily moved laterally when the machine is at work.

K are the scraper-plates, which are concaved longitudinally upon the outer sides to bring their lower edges into a suitable position for operating upon the soil and to give them such a form as will cause the soil to move freely to the rear ends of the said plates. To the forward and rear parts of the scraper-plates K are bolted or otherwise secured the lower ends of the standards L, which pass up through the ends of the cross-bars E F, and have nuts screwed upon them above and below the said cross-bars, so that the scraper-plates K may be raised and lowered, to work shallower or deeper in the ground, by adjusting the said nuts upon the said standards.

The end parts of the cross-bar F have short slots formed in them to receive the standards L, so that the forward ends of the scraper-plates K may be adjusted wider apart or closer together as the size of the plants may require.

M are the handles, the forward parts of which are connected together, and their rear parts are spread apart, as shown in Fig. 5. The handles M are pivoted to a bolt, N, attached to the center of the rear cross-bar of the frame A. The upper part of the bolt N has a screw-thread cut upon it to receive two nuts, O, which are placed upon it above and below the handles M, so that the height of the said handles M may be adjusted, as the height of the plowman may require, by adjusting the said nuts O.

In the forward end of the handles M, or in a strap attached to the said end, is formed a short slot to receive the bolt P, attached to the forward part of the bar D, to give the necessary play as the frame D E F, and with it the scraper-plates K, are moved laterally by means of the handles M.

To the forward ends of the side bars of the frame A are attached standards Q, to the lower ends of which are pivoted wheels R, to support the forward end of the machine. I prefer to use caster-wheels for convenience in turning the machine. The rear end of the machine is supported upon runners S, the ends of which, or standards attached to them, are secured to the rear parts of the side bars of the frame A.

The runners S give steadiness to the machine when at work, and thus enable the scrapers K to be more readily guided and controlled.

When the machine is to be turned the rear end of the machine is raised by means of the handles M, throwing the weight upon the wheels R, so that the machine may be turned with as much ease as a cart. With this construction, as the machine is drawn forward, the plowman, by means of the handles M, can readily guide the scraper K, however crooked the row may be, without its being necessary to change the course of the machine.

When the machine is to be used as a cultivator the forward cross-bar, F, is replaced by a longer one, to bring the forward ends of the scraper-plates K farther apart than their rear ends, and the scraper-plates K are exchanged, so that they will throw the soil toward the plants.

Having thus described my invention, I claim as new and desire to secure by Letters Patent—

1. In a scraper and cultivator, the combination, with the frame A, of the frame D E F, provided with the straps G H and the friction-rollers I J, and the scraper-plates K, substantially as herein shown and described, so that the scraper-plates K may be moved laterally without moving the main frame A, as set forth.

2. In a scraper and cultivator, the combination, with the frame A and the frame D E F, that carries the scraper-plates K, of the handles M and the bolts N P, substantially as herein shown and described, for moving the frame D E F and the scrapers K upon the frame A, as set forth.

WILLIAM LAWYER DIETZ.

Witnesses:
EDWIN SHAFER,
JOHN R. MORAN.